US006100604A

United States Patent [19]

Morroni et al.

[11] Patent Number: 6,100,604

[45] Date of Patent: Aug. 8, 2000

[54] METHOD AND APPARATUS FOR CONVERTING A MANUAL TRANSFER SWITCH INTO AN AUTOMATIC TRANSFER SWITCH

[75] Inventors: Thomas J. Morroni, Foxfield; Rodney D. Else, Brighton, both of Colo.

[73] Assignee: Electric Equipment & Engineering Co., Denver, Colo.

[21] Appl. No.: 09/320,198

[22] Filed: May 26, 1999

[51] Int. Cl.[7] .......... H02J 9/00

[52] U.S. Cl. .......... 307/64; 307/112

[58] Field of Search .......... 307/112, 113, 307/115, 126, 29, 119, 137, 64

[56] References Cited

U.S. PATENT DOCUMENTS 3,778,633 12/1973 DeVisser et al. .......... 307/64

*Primary Examiner*—Fritz Fleming

*Assistant Examiner*—Robert L. DeBeradinis

*Attorney, Agent, or Firm*—Marger Johnson & McCollom, P.C.

[57] ABSTRACT

An installed manual transfer switch is converted into an automatic transfer switch. A conversion assembly is mechanically mounted directly onto the already installed manual transfer switch. A controller is electrically coupled to the conversion assembly and automatically controls movements of the conversion assembly. The controller monitors the power supplies connected to the manual transfer switch and automatically moves the conversion assembly into different positions to change the switching arrangement of the manual transfer switch according to the monitored power supplies. The conversion assembly is mounted to the manual transfer switch without having to electrically disconnect the manual transfer switch from an electrical load center and without having to physically remove the manual transfer switch from an electrical panel box containing the manual transfer switch. To reduce the number of mechanical parts and to increase safety, a single motor operator is used to rotate a cam that controls all mechanical movement of the conversion assembly. To maintain substantially the same width of the panel box, the motor operator is designed to insert in between two circuit breakers in the manual transfer switch. The electrical panel door in the currently installed electrical panel box is replaced with a conversion door that holds the controller that plugs into the conversion assembly.

38 Claims, 12 Drawing Sheets

METHOD AND APPARATUS FOR CONVERTING A MANUAL TRANSFER SWITCH INTO AN AUTOMATIC TRANSFER SWITCH

BACKGROUND OF THE INVENTION

This invention relates to transfer switches and more particularly to a system for converting a manual transfer switch into an automatic transfer switch.

Transfer switches are used for switching between multiple power supplies. Electrical equipment may be powered normally from a primary Alternating Current (A.C.) or Direct Current (D.C.) power supply. If the primary power supply goes down, the transfer switch switches out the primary power supply and switches in a secondary power supply to power the electrical equipment.

A manual transfer switch requires a system operator to manually throw one or more switches that disconnect the primary power supply from the electrical equipment and switch in the secondary power supply. An automatic transfer switch continuously senses the voltage levels of the power supplies. When a power outage on the primary power supply is detected, the automatic transfer switch then automatically switches out the primary power supply and automatically switches in the secondary power supply.

Electrical equipment may be installed initially with a manual transfer switch. Due to changing system requirements, it might then be necessary to replace the manual transfer switch with an automatic transfer switch. Replacement typically requires swapping out the entire electrical panel that holds both the manual transfer switch, electrical circuit breakers and other power circuitry. This replacement is prohibitively expensive and not cost effective especially when a large number of manual transfer switches have to be replaced.

Another problem exists when only a percentage of automatic transfer switches need to be installed, but may have to be installed at different locations at different times. This is particularly true in wireless cellular telephone systems that include hundreds of cell sites that each from time to time may require a backup power supply. Many cell sites have manual transfer switch systems that allow a portable power supply to power the cell site when a power outage occurs in the primary power supply.

Communication critical cell site locations, or difficult to access cell site locations, may need to be upgraded either permanently or temporarily with automatic transfer switches and a secondary power supply. This eliminates a technician from having to transport a portable power supply to these locations during power outages. The problem is that traffic patterns identifying critical cellular communication sites or chronically unreliable cell sites often cannot be determined until after the cell site is already up and running. Therefore, it cannot be determined which cell sites qualify for automatic power transfer switching until after the cell site is already installed with a manual transfer switch.

Accordingly, a need remains for quickly, inexpensively and reliably converting an operating manual transfer switch into an automatic transfer switch without a significant power outage.

SUMMARY OF THE INVENTION

The invention converts an installed manual transfer switch into an automatic transfer switch. A conversion assembly is mechanically mounted directly onto the already installed manual transfer switch. A controller is electrically coupled to the conversion assembly and automatically controls movements of the conversion assembly. The controller monitors the power supplies connected to the manual transfer switch and automatically moves the conversion assembly into different positions to change the switching configuration of the manual transfer switch according to the monitored power supplies.

The conversion assembly is mounted to the manual transfer switch without having to electrically disconnect the manual transfer switch from an electrical load center and without having to physically remove the manual transfer switch from an electrical panel box containing the manual transfer switch. To reduce the number of mechanical parts and to increase safety, a single motor operator is used to control all mechanical movement of the conversion assembly. To maintain substantially the same depth of the panel box, the motor operator is designed to be installed between two circuit breakers in the manual transfer switch. The electrical panel door in the currently installed electrical panel box is replaced with a conversion door that holds the controller. A cable plugs the controller into the conversion assembly.

A cam is rotated by the motor operator in a first direction to turn on a first circuit breaker in the manual transfer switch and turn off a second circuit breaker in the manual transfer switch. The cam is rotated in a second direction to reverse the on-off positions for the two circuit breakers. In the first cam rotational direction, a first actuator assembly is lowered shutting off the first power supply and a second actuator assembly is raised turning on the second power supply. The cam is rotated in the opposite direction to then raise the first actuator assembly and lower the second actuator assembly. The cam can be rotated into an intermediate position to turn off both the first and second power supply.

The foregoing and other objects, features and advantages of the invention will become more readily apparent from the following detailed description of a preferred embodiment of the invention which proceeds with reference to the accompanying drawings.

DETAILED DESCRIPTION

Figure 1:
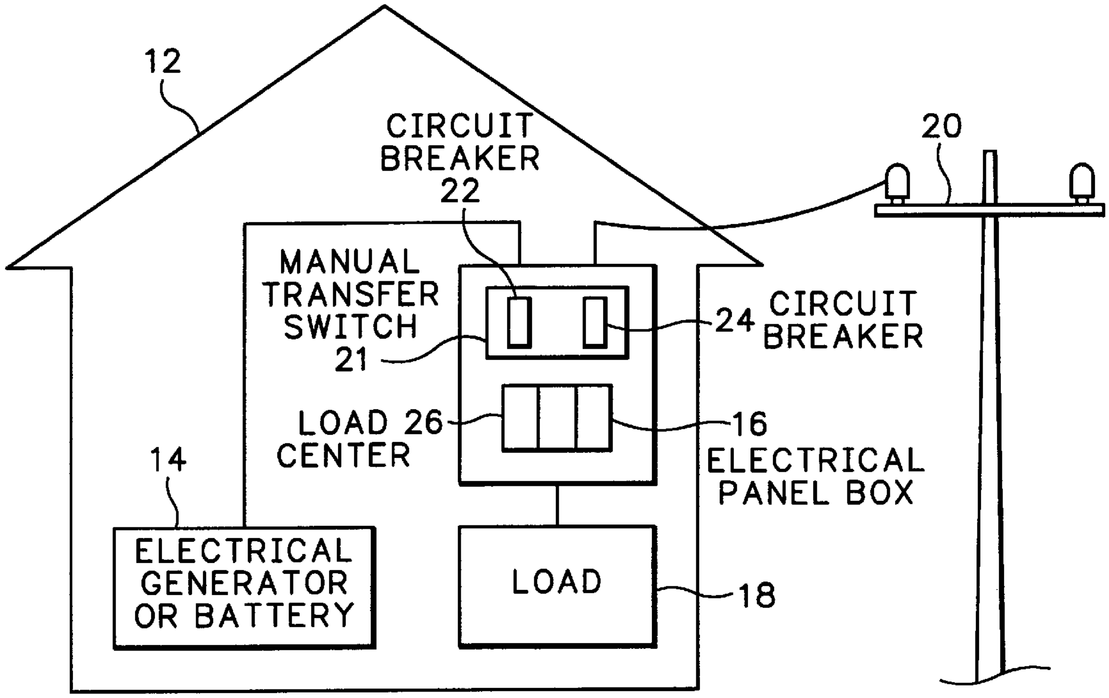
FIG. 1 is a diagram showing a manual transfer switch located in an electrical equipment building.

FIG. 1 shows an electrical panel box 16 mounted on the wall of an electrical equipment building 12. The panel box 16 includes a load center 26 that includes an array of circuit breakers. The panel box 16 also includes a manual transfer switch 21 that has two circuit breakers 22 and 24. The first circuit breaker 24 in the manual transfer switch 21 connects and disconnects a primary power supply 20 to the load center 26. The second circuit breaker 22 connects and disconnects a secondary power supply 14 to the load center 26.

The primary power supply 20 is shown as an A.C. power source from a power line and the secondary power supply 14 is shown as an A.C. generator or D.C. battery 14. The invention is applicable to any combination and types of power supplies. A load 18 is powered from either the primary power supply or the secondary power supply through the load center 18. The load 18 in one embodiment of the invention is electrical equipment used in a cellular telephone site. The invention is described with respect to a manual transfer switch having two circuit breakers. However, the invention is applicable to any manual transfer switching system including one or more switches that switch between one or more power supplies.

Figure 2B:
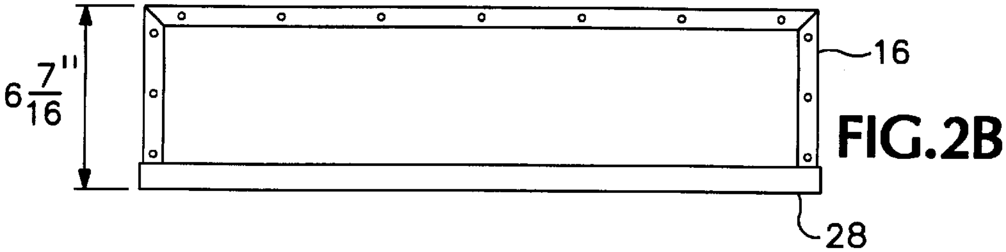
FIG. 2B is a top view of the electrical panel box shown in FIG. 2A.
Figure 2A:
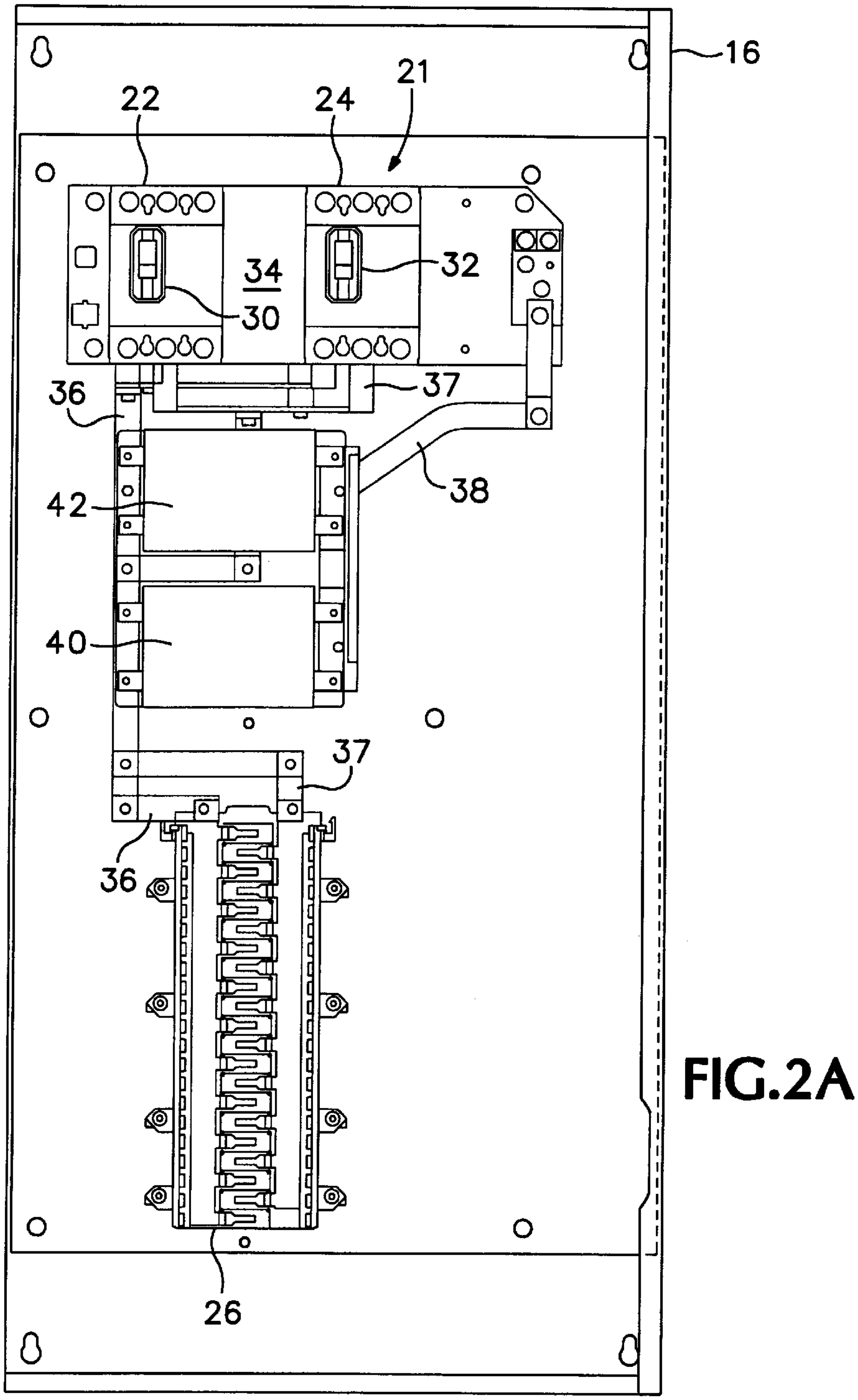
FIG. 2A is a enlarged front view of an electrical panel box shown in FIG. 1.

FIG. 2A is an enlarged front view of the electrical panel box 16 shown in FIG. 1 with a front door removed. FIG. 2B is an enlarged top view of the electrical panel box 16 shown in FIG. 1 with the front door 28 attached. The manual transfer switch 21 contains a lever 30 for opening and closing circuit breaker 22 and a lever 32 for opening and closing circuit breaker 24. The normal width of the electrical panel box 16, including door 28 is about 6 and 7/16ths inches.

A first phase for one of the first or second power supplies (FIG. 1) is coupled via a bus bar 36 to a first transient suppression device 42 and a first bus in the load center 26. A second phase for the first or second power supply is coupled via a bus bar 37 to a second transient suppression device 40 and a second bus in the load center 26. A neutral for the power supplies is coupled via a bus bar 38 to the opposite ends of the two transient suppression devices 42 and 40.

The transient suppression devices 42 and 40 are described in U.S. Pat. Nos. 5,602,532 and 5,701,227 which are herein incorporated by reference. The circuitry inside circuit breakers 22 and 24 is generally known to those skilled in the art, and is therefore not described in further detail.

Of particular interest is the physical arrangement of the two circuit breakers 22 and 24 that allow attachment of a conversion assembly 46 shown in FIGS. 3–8. A space 34 is maintained between the two circuit breakers 22 and 24 for receiving part of the conversion assembly 46. Space 34 allows the conversion assembly 46 to maintain a shallow profile inside the panel box 16.

The manual transfer switch 21 works in the following manner. When a first one of the circuit breakers, say circuit breaker 24 is in a closed position, power from the primary power supply 20 (FIG. 1) is coupled past the two transient suppression boxes 42 and 40 and to the load center 26. Alternatively, when circuit breaker 22 is closed, power from the secondary power supply 14 is coupled past the transient suppression boxes 42 and 40 and to the load center 26.

Figure 3A:
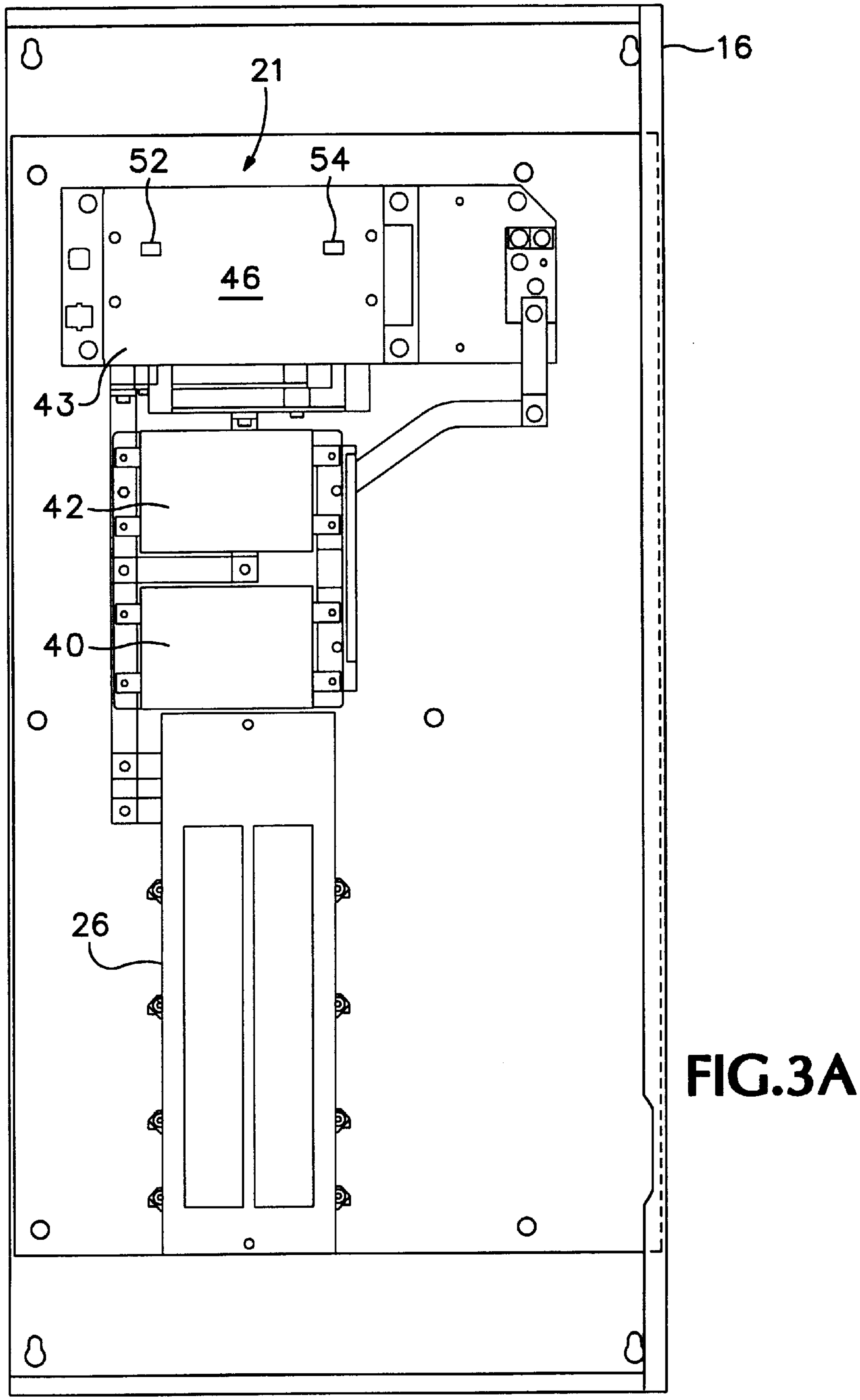
FIG. 3A is a front view of the electrical panel box shown in FIG. 2A with a front door removed and containing a conversion assembly.
Figure 3B:
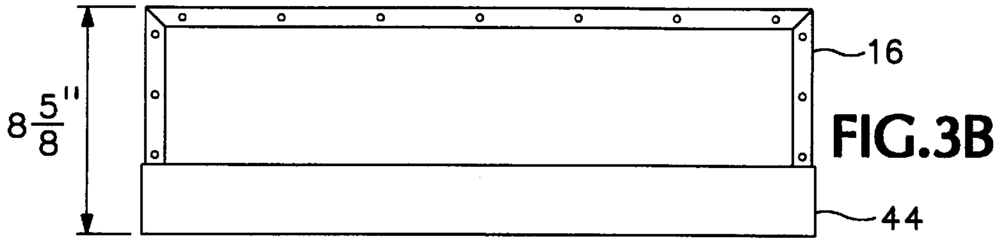
FIG. 3B is a top view of the electrical panel box shown in FIG. 3A with a conversion door attached.

FIG. 3A is a front view, of the electrical panel box 16 with a conversion assembly 46 mounted to the front of the manual transfer switch 21. The conversion assembly 46 converts the manual transfer switch 21 into an automatic transfer switch. The conversion assembly 46 is bolted onto the front of the manual transfer switch 21 and does not require the manual transfer switch 21 to be replaced, electrically disconnected, or modified from its originally installed condition. A front cover 43 on the conversion assembly 46 includes two holes 52 and 54 that show the on and off state of the two circuit breakers 22 and 24.

Only one modification needs to be made to the electrical panel box 16 when the manual transfer switch 21 in converted into an automatic transfer switch. That is the replacement of the front door 28 (FIG. 2B) with a new front panel door 44 shown in FIGS. 3B and 3C. The new panel door 44 extends slightly the total depth of the panel box 16 and holds a controller 50 that controls the conversion assembly 46.

During initial installation, both circuit breakers 22 and 24 are turned off. The operator assembly 46 is seated over the circuit breakers 22 and 24. A back plate 47 (FIG. 4) is screwed onto the front of the manual transfer switch 21. Because the conversion assembly 46 has such a shallow profile, the entire depth of the panel box 16 is only about 8 and 5/8ths inches. This is only about 2 inches deeper than the original depth of the electrical panel box 16 shown in FIG. 2B. As stated above, it is important not to substantially increase the depth of the electrical panel box 16 when retrofitted into an automatic transfer switch. This is because the space containing the electrical panel box 16, such as building 12, is often limited. Not substantially increasing the depth of the panel box 16 allows the manual transfer switch to be retrofitted into an automatic transfer switch in a wider variety of locations.

Figure 4:
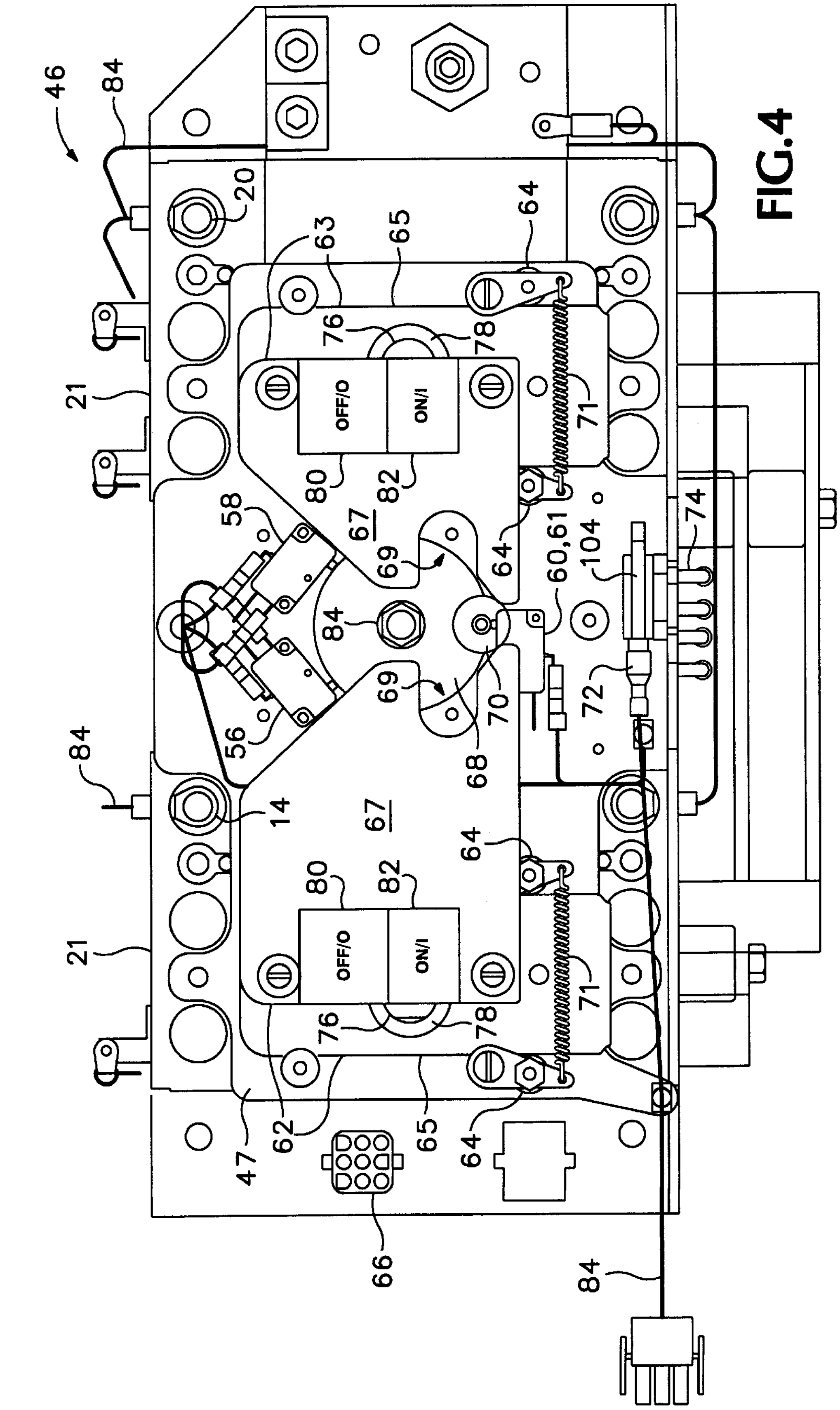
FIG. 4 is an enlarged front view of the conversion assembly shown in FIGS. 3A–3C without a front cover attached and in an intermediate position

FIG. 4 is an enlarged view of the conversion assembly 46 that converts the installed manual transfer switch 21 into an automatic transfer switch. The conversion assembly 46 includes a left actuator assembly 62 and a right actuator assembly 63 that each engage one of the circuit breakers in the installed manual transfer switch 21. An operator includes a cam 68 that moves the actuator assemblies 62 and 63 into different positions that change which of the circuit breakers 22 and 24 (FIG. 2A) are open and closed.

Figure 3C:
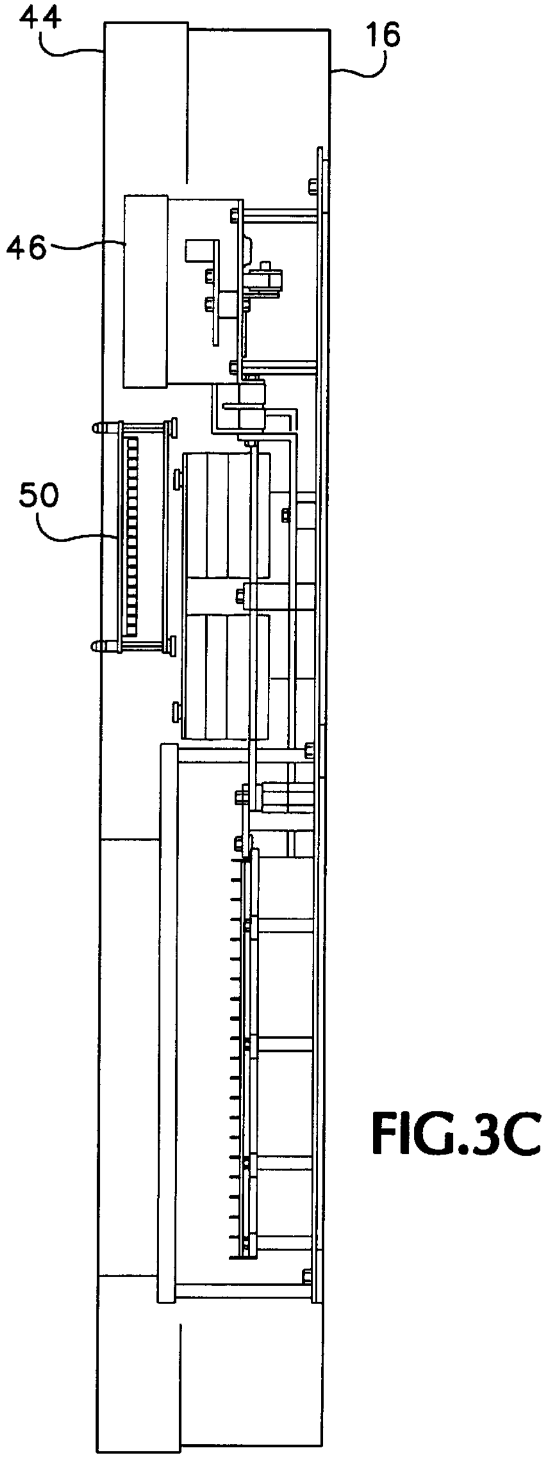
FIG. 3C is a side view of the electrical panel box showing the attached conversion assembly and a controller connected to the front door.

Cable 84 electrically couple the controller 50 shown in FIG. 3C to both the primary power source 20 and the secondary power source 14. The cable 84 also includes wires that monitor the open and closed condition of switches 56, 58, 60, 61 and 72. The controller 50 is described in further detail in FIGS. 9 and 10. A switch 104 shuts off power to the conversion assembly when front cover 43 is removed.

Figure 5:
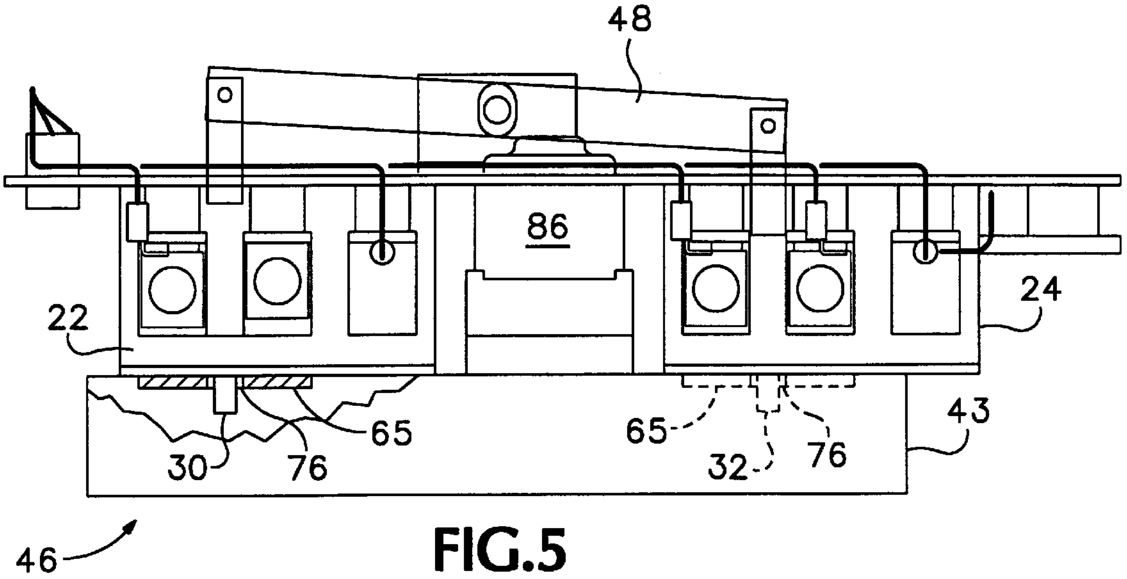
FIG. 5 is a top view of the conversion assembly.
Figure 6:
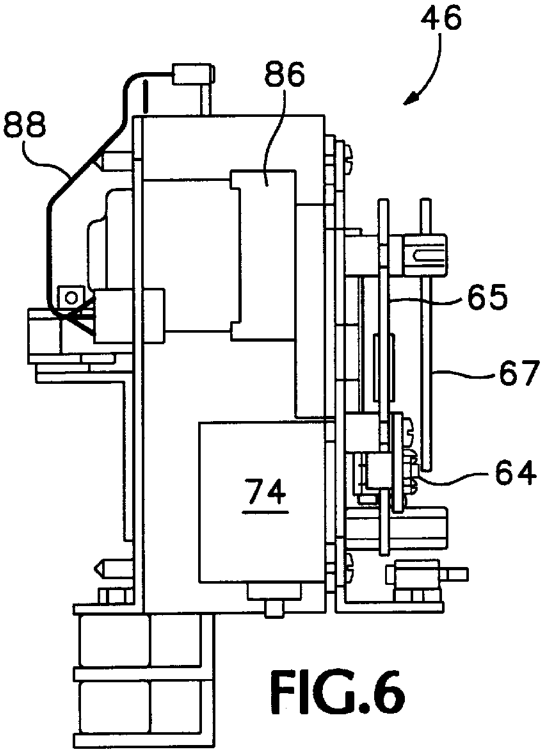
FIG. 6 is a side view of the conversion assembly.
Figure 7:
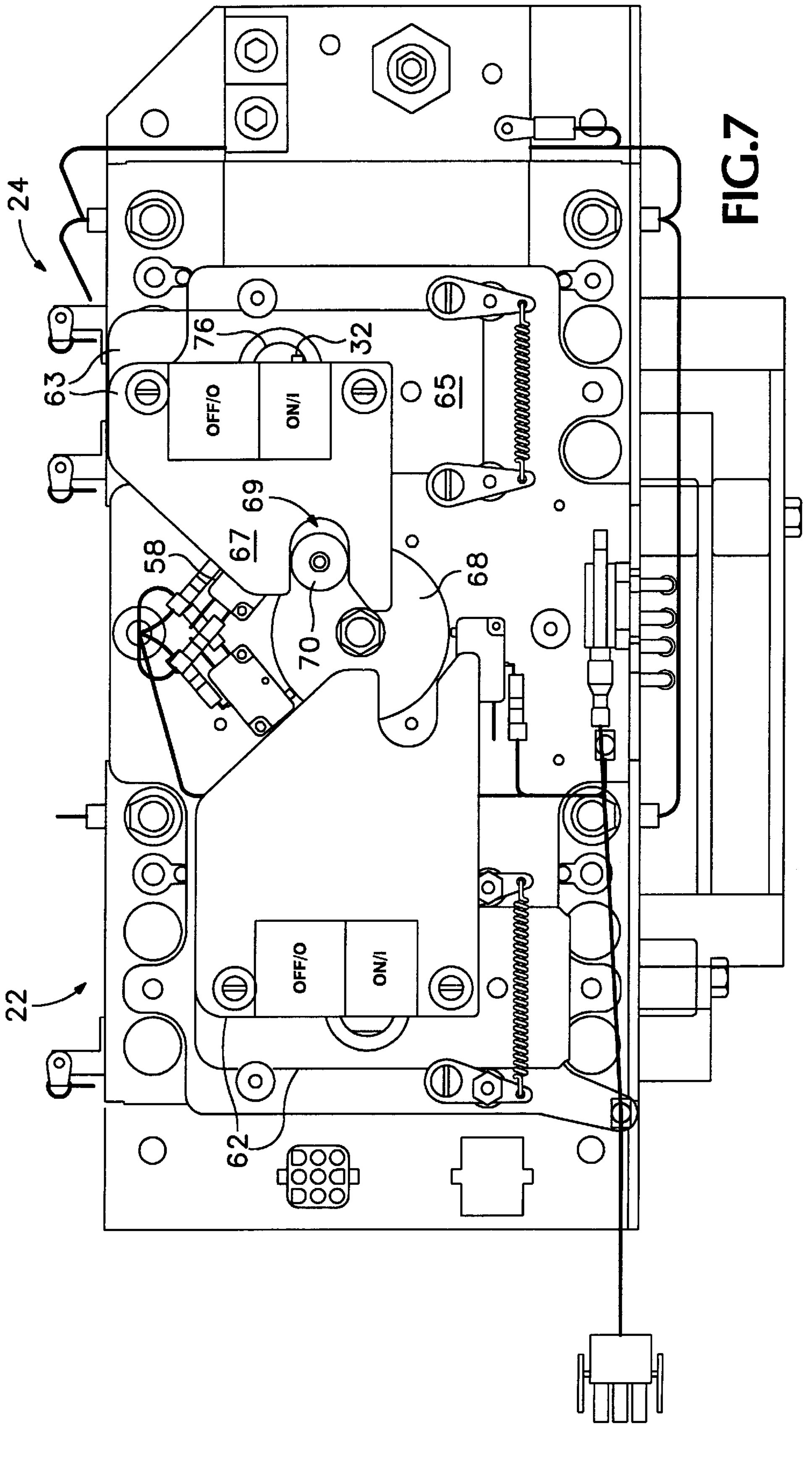
FIG. 7 is a front view of the conversion assembly with a primary circuit breaker in an on position.
Figure 8:
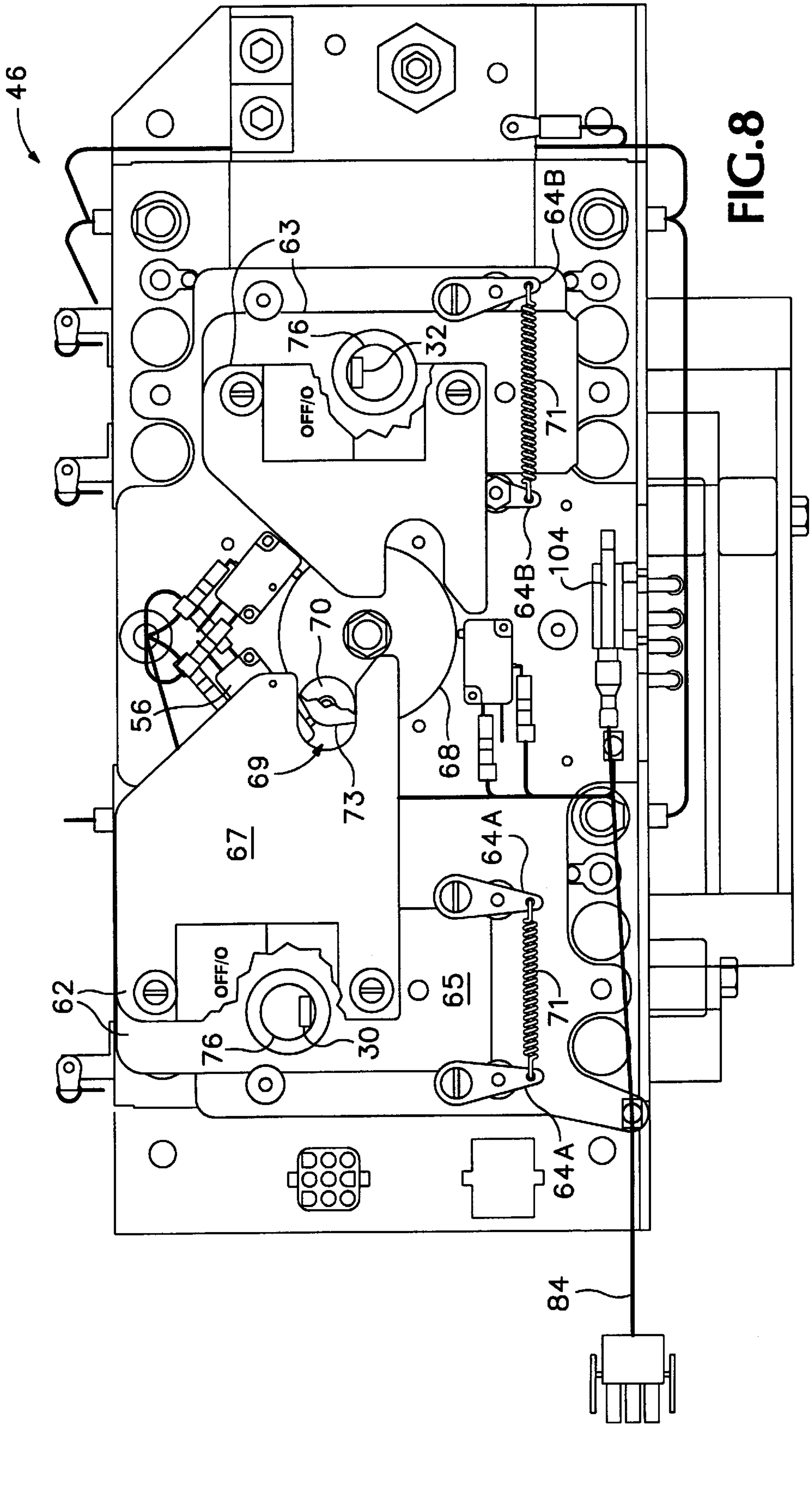
FIG. 8 is a front view of the conversion assembly with a secondary circuit breaker in an on position.

Referring to FIGS. 4–8, the left actuator assembly 62 seats over the lever 30 on the circuit breaker 22 (FIGS. 6 and 8). The right actuator assembly 63 seats over the lever 32 on the circuit breaker 24. The left and right actuator assemblies 62 and 63 each include an actuator plate 65 that includes a hole 76 that seats over the levers 30 and 32, respectively. The holes 76 are shown in the partially broken away view of FIG. 8 and each include a rubber gasket 78 that improves the ability of the holes 76 in the actuator plates 65 to grip the levers 30 and 32.

Cam followers 64 are located on opposite sides of the actuator plates 65. A spring 71 pulls the cam followers 64 against the opposite sides of the actuator plates 65. The force of the cam followers 64 keep the actuator plates 65 from shifting after being moved into different positions by the cam 68.

The left and right actuator assemblies 62 and 63 also include face plates 67 that are bolted to the actuator plates 65. The face plates 67 each have slots 69 that receive and move in accordance with a rotational direction of the cam 68. The face plates 67 each include an "off" label 80 and an "on" label 82.

In addition to the cam 68, the operator also includes a motor 86 (FIGS. 5 and 6) that controls movements of the left and right actuator assemblies 62 and 63 by rotating the cam 68 in either a clockwise or counterclockwise direction. The cam 68 includes a hex cam extension 84. A wrench can be coupled to the hex cam extension 84 for manually moving the cam 68.

A cam roller 70 is connected to the edge of the cam 68 and engages with the slots 69 in either the left or right face plates 67. The outside edge of the cam 68 behind the cam roller 70 includes a hump 73 shown in a partially broken away view in FIG. 8. As the cam 68 is rotated, the hump 73 moves underneath one of the switches 56, 58, 60 or 61. That switch is activated. The open and closed positions of the switches 56, 58, 60 and 61 are used by the controller 50 to monitor the position the cam 68.

As shown in FIGS. 5 and 6, the motor 86 sits in between the circuit breakers 22 and 24. A motor capacitor 74 also sits between the circuit breakers 22 and 24. Positioning the motor 86 and motor capacitor 74 between the circuit breakers allow only a shallow portion of the conversion assembly 46 to extend out in front of the circuit breakers.

The conversion assembly 46 is shown in an intermediate position in FIG. 4. In the intermediate position, the cam roller 70 sits between the left and right actuator face plates 67. Both the left actuator assembly 62 and the right actuator assembly 63 are in a lowered "off" position. In this lowered position, the circuit breakers 22 and 24 are both off disconnecting both the primary power supply 20 and the secondary power supply 14 from the load center 26.

FIG. 5 also shows an optional mechanical interlock 48 that prevents circuit breakers 22 and 24 from both being on at the same time. Even if the conversion assembly 46 fails, the mechanical interlock 48 prevents accidental closure of both circuit breakers 22 and 24 at the same time. If the circuit breaker 24 is moved into a closed position, the interlock 48 automatically forces circuit breaker 22 into an open position. In a corresponding manner, if the circuit breaker 22 is closed, the interlock 48 automatically forces circuit breaker 24 in to an open condition.

Referring to FIG. 7, the motor 86 rotates the cam 68 in a counterclockwise direction to turn on the right circuit breaker 24. As the cam 70 is rotated counterclockwise, the cam roller 70 moves into slot 69. As cam 68 rotates further in the counterclockwise direction, the cam roller 70 moves the actuator face plate 67 upwards. Face plate 67 moves actuator plate 65 upward causing the hole 76 in plate 65 to flip up circuit breaker lever 32.

Motor 86 rotates cam 68 in the counterclockwise direction until the hump 73 on the outside edge of the cam 68 activates limit switch 58. Controller 50 stops motor 86 when activation of limit switch 58 is detected. The controller 50 continuously monitors the voltage level of the primary and secondary power supplies 20 and 14, respectively. If the voltage level of primary power supply 20 drops below a predetermined level, controller 50 automatically starts motor 86 rotating cam 68 in a clockwise direction. This moves actuator assembly 63 back down toward the intermediate position previously shown in FIG. 4. As the actuator assembly 63 moves downward, the actuator plate 65 pulls the lever 32 downward. Circuit breaker 24 in turn shuts off disconnecting the primary power supply 20 from the load center 26.

Referring to FIG. 8, the controller 50 continues to cause the motor 86 to rotate cam 68 in the clockwise direction past the intermediate position shown in FIG. 4. The cam roller 70 moves into slot 69 of actuator assembly 62. As cam 68 as continues to rotate in the clockwise direction, cam roller 70 moves actuator assembly 62 upward. The actuator plate 65 in turn lifts up lever 30 turning on circuit breaker 22. Motor 86 rotates cam 68 in the clockwise direction until the hump 73 on the edge of cam 68 activates limit switch 56. Controller 50 detects the activation of limit switch 56 and stops motor 86.

The cam followers 64A shown in FIG. 8 hold the actuator assembly 62 up in the on position while the cam followers 64B hold the actuator assembly 63 down in the off position. The cam followers 64 prevent vibrations from inadvertently changing the logical on and off positions of the actuator assemblies 62 and 63.

The cam 68 moves the left and right actuator assemblies 67 mutually exclusive of each other into either the on or off positions. In other words, the cam 68 cannot move both of the actuator assembly 62 and 63 into the on position at the same time. Thus, even if the controller 50 fails, the conversion assembly 46 will not accidentally connect more than one power supply to the load center 26 at the same time. The simple structure of the conversion assembly shown in FIGS. 4–8 also reduces the number of required parts while preserving an extremely shallow profile. Because there are very few moving parts, the operator assembly is also less expensive to manufacture and at the same time more reliable.

Figure 9A:
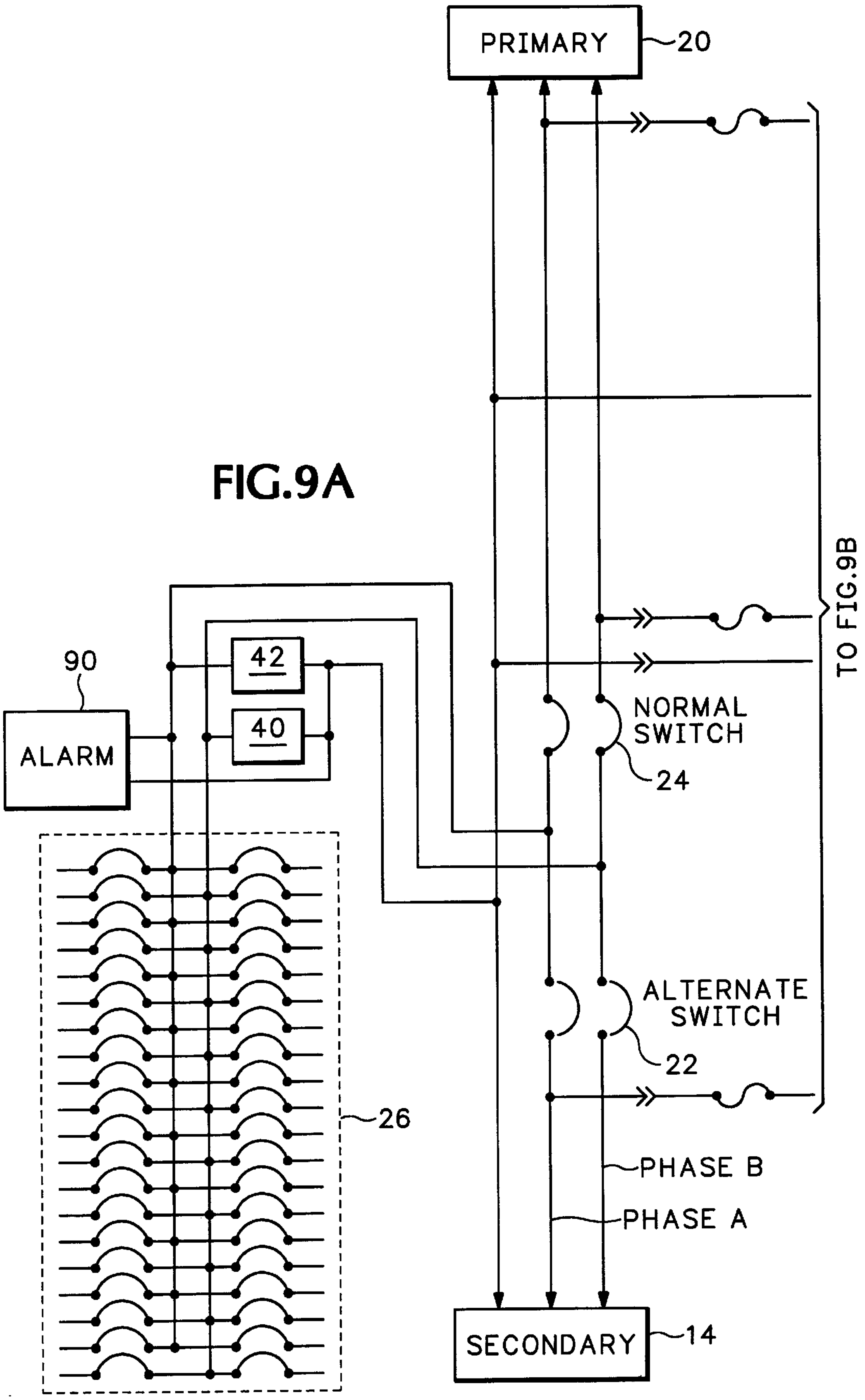
FIG. 9 is a circuit diagram showing how the conversion assembly is connected to multiple power supplies.
Figure 9B:
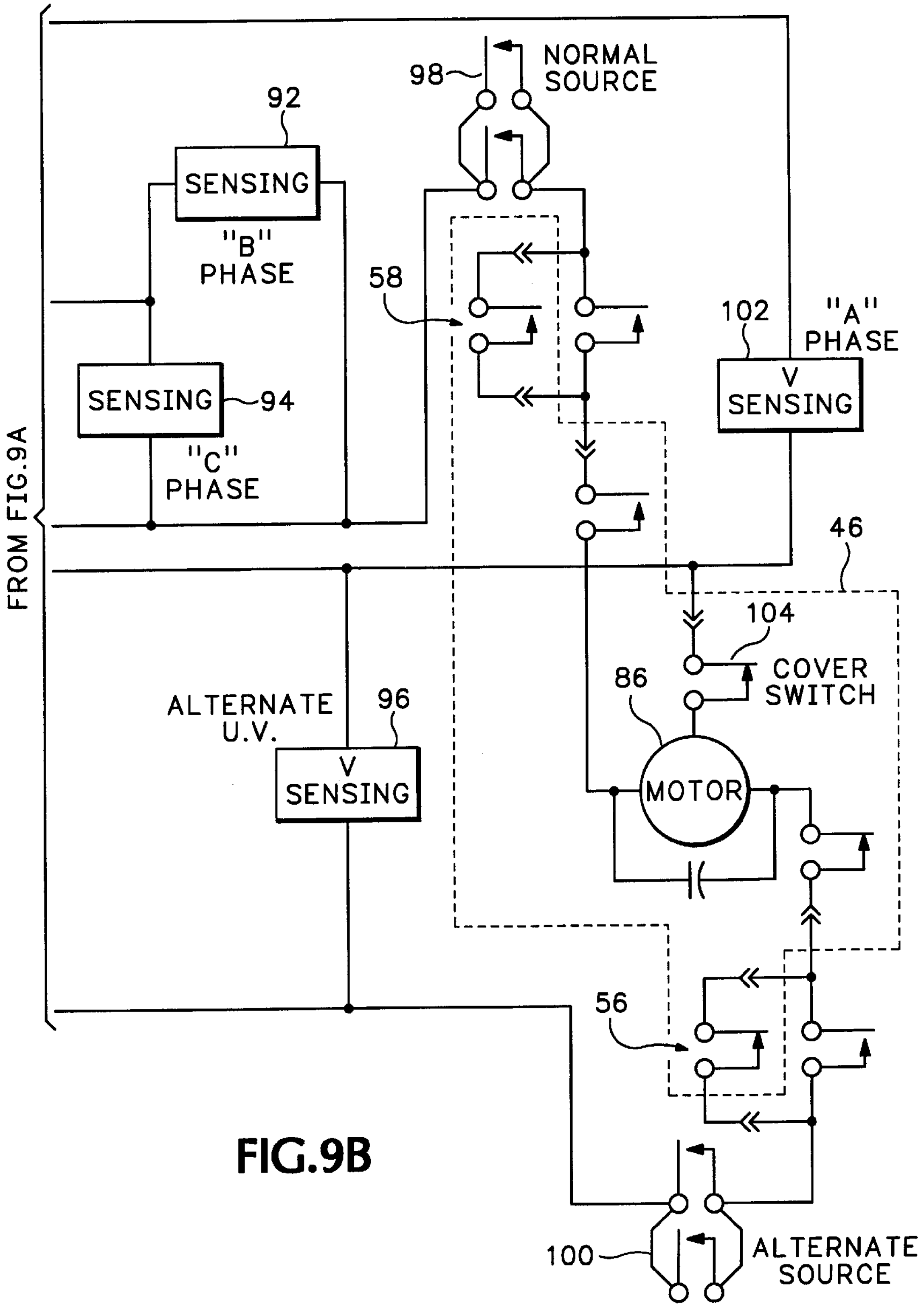

FIG. 9 is a circuit diagram showing how the conversion assembly 46 is coupled to the primary power supply 20 and the secondary power supply 14. The hot wires from phase A and phase B of the primary power supply 20 and the secondary power supply 14 are coupled to the transient suppression devices 42 and 40. The load center 26 is coupled to the primary power supply 20 via the switch 24 and coupled to the secondary power supply 14 via the switch 22. An alarm 90 is connected between one of the hot power lines and neutral.

Sensing circuits 92, 94 and 102 sense the voltage on each phase of the primary power supply 20. Sensing circuit 96 senses the voltage on the secondary power supply 14. Switch 98 controls power from the primary power supply 20 to the motor 86 and switch 100 controls power from the secondary power supply 14 to the motor 86. Limit switches 58 and 56 sense the position of the cam 68 as described above. Cover switch 104 disables power to the motor 86 when the cover 43 is removed from the conversion assembly 46.

If the currently connected power supply falls below a predetermined voltage level, the controller 50 uses power from the other power supply by controlling switches 98 and 100 to energize motor 86. The motor 86 rotates cam 68 until the appropriate one of the switches 58 or 56 is tripped. The tripped switch indicates that the open and closed positions of circuit breakers 24 or 22.

Figure 10A:
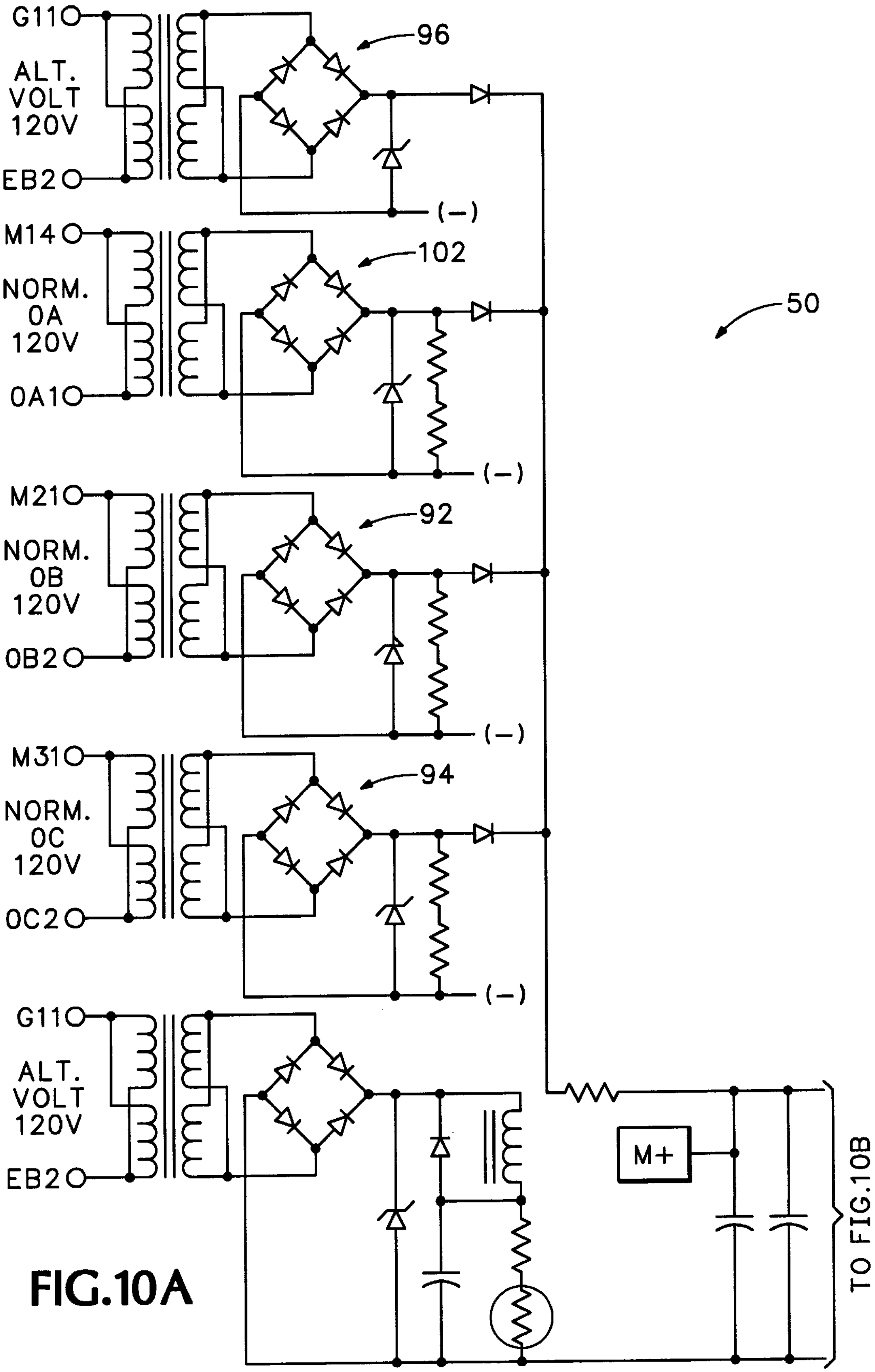
FIG. 10 is a circuit diagram for a controller used with the conversion assembly.
Figure 10B:
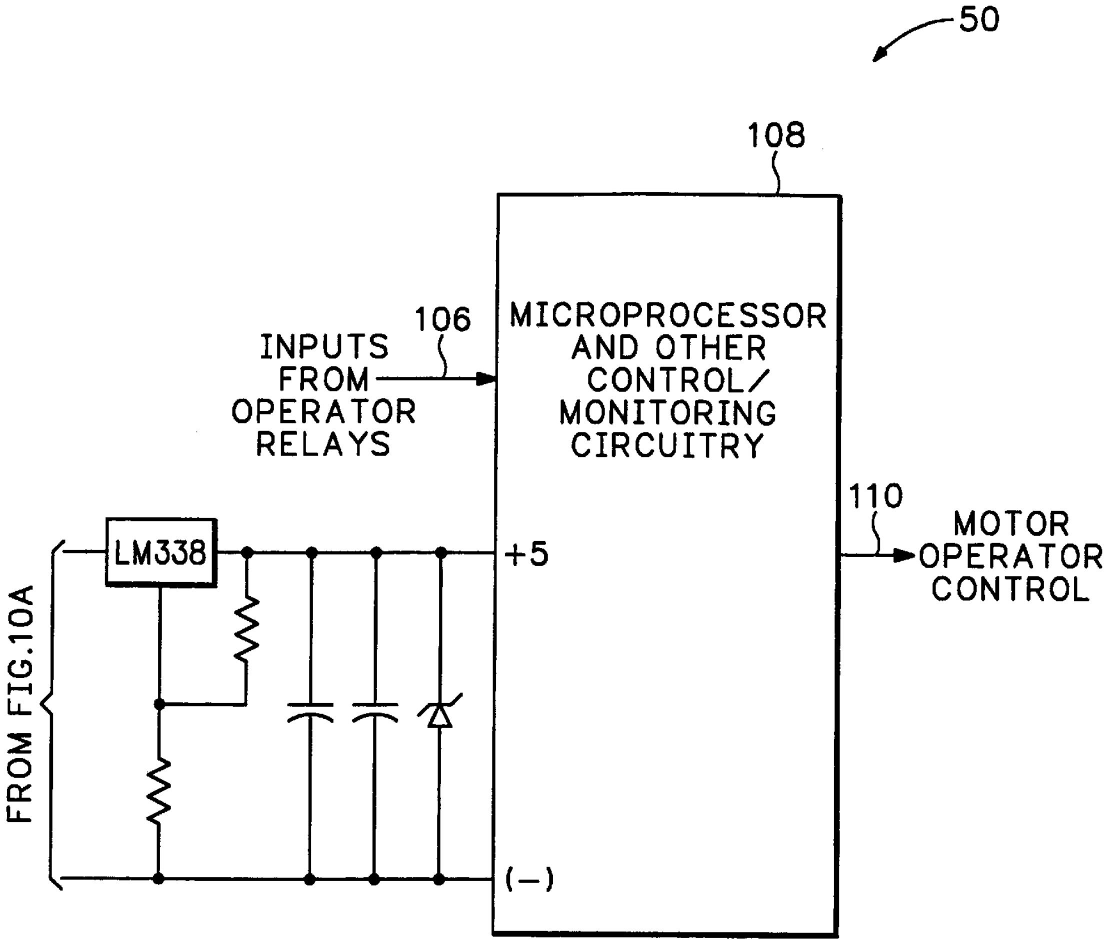

FIG. 10 is a detailed circuit diagram showing additional circuitry inside the controller 50. The sensing circuits 92, 94, 96 and 102 sense voltage on the primary and secondary power supplies as shown in FIG. 9. A microprocessor and other control monitoring circuitry 108 monitors the voltage levels of the primary and secondary power supplies via the sensing circuits. Inputs 106 from the limit switches 56, 58, 60, 61 and 104 are also monitored by the circuitry 108.

According to the monitored signals, microprocessor 108 outputs control signals 110 that control the movements of conversion assembly 46.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for converting an installed manual transfer switch connected to one or more power supplies into an automatic transfer switch, comprising:

an actuator including a first actuator assembly and a second actuator assembly for moving levers on the installed manual transfer switch;

an operator that moves the first and second actuator assemblies in different directions that change how the manual transfer switch connects the power supplies to a load; and a controller that controls when the operator moves into the different positions according to sensed power on the power supplies.

2. A system according to claim 1 wherein the first actuator assembly seats over a first lever on a first circuit breaker or circuit interrupter in the manual transfer switch and the second actuator assembly that seats over a second lever on a second circuit breaker or circuit interrupter in the manual transfer switch, the operator moving the first actuator assembly to an up or down position while at the same time moving the second actuator assembly into an opposite up or down position with respect to the first actuator assembly.

3. A system according to claim 2 wherein the, actuator forces the first circuit breaker lever into a first up or down position where one of the up or down positions corresponds with an on condition and the other one of the up or down positions corresponds with an off condition and forcing the second circuit breaker lever into a second up or down position opposite to the first up or down position corresponding to an opposite on or off condition from the first circuit breaker lever.

4. A system according to claim 1 wherein the operator includes a motor positioned to operate a first and second circuit breaker or circuit interrupter, the first and second circuit breaker or circuit interrupter each aligned in the same vertical orientation and each including switches, the switches each moving in the same direction for connecting power and each moving in the same opposite direction for disconnecting power.

5. A system according to claim 1 wherein the controller is attached to a panel door and including a cable that electrically couples the controller to the operator and to the power supplies.

6. A system for converting an installed manual transfer switch connected to one or more power supplies into an automatic transfer switch, comprising:

an actuator attaching to the installed manual transfer switch and including a first actuator assembly that seats over a first lever on a first circuit breaker in the manual transfer switch and a second actuator assembly that seats over a second lever on a second circuit breaker in the manual transfer switch, the first actuator assembly and the second actuator assembly each including face plates having slots for receiving the operator and moving in accordance with a rotational direction of the operator;

an operator that moves the actuator into different positions that change how the manual transfer switch connects the power supplies to a load, and a controller that controls when the operator moves into the different positions according to sensed power on the power supplies.

7. A system for converting an installed manual transfer switch connected to one or more power supplies into an automatic transfer switch, comprising:

an actuator attaching to the installed manual transfer switch and including a first actuator assembly that seats over a first lever on a first circuit breaker in the manual transfer switch and a second actuator assembly that seats over a second lever on a second circuit breaker in the manual transfer switch;

an operator that moves the actuator into different positions that change how the manual transfer switch connects the power supplies to a load, the operator moving the first actuator assembly and the second actuator assembly mutually exclusive of each other into either an on position or an off position; and a controller that controls when the operator moves into the different positions according to sensed power on the power supplies.

8. A system according to claim 7 wherein the operator moves both the first actuator assembly and the second actuator assembly into an intermediate off position.

9. A system for converting an installed manual transfer switch connected to one or more power supplies into an automatic transfer switch, comprising:

an actuator attaching to the installed manual transfer switch;

an operator that moves the actuator into different positions that change how the manual transfer switch connects the power supplies to a load, the operator including a cam coupled to a motor that controls movements of the actuator by rotating the cam in either a clockwise or counterclockwise direction; and a controller that controls when the operator moves into the different positions according to sensed power on the power supplies.

10. A system according to claim 9 wherein the operator includes a cam roller connected to the cam that engages with slots in the actuator while the cam is rotated by the motor.

11. A system according to claim 9 wherein the cam includes a hump that activates different switches that identify the position of the cam to the controller.

12. A system according to claim 9 wherein the same motor and the same cam control all movements of the actuator.

13. A system according to claim 12 including an extension extending from the cam for receiving a wrench for manually moving the actuator.

14. A system for converting an installed manual transfer switch connected to one or more power supplies into an automatic transfer switch, comprising:

an actuator attaching to the installed manual transfer switch;

an operator that moves the actuator into different positions that change how the manual transfer switch connects the power supplies to a load;

a controller that controls when the operator moves into the different positions according to sensed power on the power supplies; and cam followers preventing the actuator from moving from the different positions instigated by the operator.

15. A system according to claim 14 including a spring coupled between the cam followers pulling the cam followers against opposite sides of the actuator.

16. A system for converting an installed manual transfer switch having at least two switches into an automatic transfer switch, comprising:

a conversion assembly that mechanically mounts onto the installed manual transfer switch and mechanically moves the manual transfer switch into different switching configurations that couple different power supplies to a load; and a controller electrically coupled to the conversion assembly that automatically moves the conversion assembly into different positions according to a power status of the power supplies, the controller variably controlling an amount of time from when a first one of the switches turns off to when another one of the switches turns on.

17. A system according to claim 16 wherein the controller moves a first conversion assembly and a second conversion assembly actuator mutually exclusive to each other in different directions.

18. A system according to claim 16 wherein the conversion assembly includes a single motor operator that controls the amount of time between when the first one of the switches turns off and the other one of the switches turns on by activating and deactivating the motor operator.

19. A system according to claim 18 including a conversion door exchangeable with a door on an electrical panel box that holds the manual transfer switch.

20. A system according to claim 16 wherein the controller moves the conversion assembly into an intermediate position that turns off at least two of the switches at the same time.

21. A system for converting an installed manual transfer switch into an automatic transfer switch, comprising:

a conversion assembly that mechanically mounts onto the installed manual transfer switch and mechanically moves the manual transfer switch into different switching configurations that couple different power supplies to a load, the conversion assembly including a single motor operator that controls all movements of the conversion assembly:

a controller electrically coupled to the conversion assembly that automatically moves the conversion assembly into different positions according to a power status of the power supplies; and a conversion door exchangeable with a door on an electrical panel box that holds the manual transfer switch wherein the conversion door holds the controller and includes an electrical cable that electrically couples the controller to the conversion assembly.

22. A system for converting an installed manual transfer switch into an automatic transfer switch, comprising:

a conversion assembly that mechanically mounts onto the installed manual transfer switch and mechanically moves the manual transfer switch into different switching configurations that couple different power supplies to a load, the conversion assembly including a single motor operator that controls all movements of the conversion assembly;

a controller electrically coupled to the conversion assembly that automatically moves the conversion assembly into different positions according to a power status of the power supplies; and a conversion door exchangeable with a door on an electrical panel box that holds the manual transfer switch wherein the conversion door extends the depth of the panel box by about three inches.

23. A method for converting an installed manual transfer switch having first and second switches into an automatic transfer switch, comprising:

providing a conversion assembly;

mechanically mounting the conversion assembly directly onto the installed manual transfer switch;

electrically coupling a controller to the conversion assembly that automatically controls movements of the conversion assembly;

monitoring power supplies connected to the manual transfer switch with the controller;

automatically moving the conversion assembly into different positions to change the switching arrangements of the manual transfer switch according to the monitored power supplies; and controlling an amount of time the first one of the switches and the second one of the switches both remain turned off by moving the conversion assembly into an intermediate position.

24. A method according to claim 23 including mounting the conversion assembly to the manual transfer switch without disconnecting the manual transfer switch from an electrical load center and without removing the manual transfer switch from an electrical panel box containing the manual transfer switch.

25. A method according to claim 24 including controlling all mechanical movement of the conversion assembly with a motor operator and controlling the amount of deactivation time when both the first and second switches are shut off by controlling how long the motor operator is deactivated when in the intermediate position.

26. A method according to claim 25 including switching the first and second switches in opposite directions corresponding to opposite on-off conditions by moving a first part and a second part of the conversion assembly in opposite directions.

27. A method according to claim 26 including exchanging an electrical panel door in an electrical panel box holding the manual transfer switch with a conversion door that holds the controller.

28. A method according to claim 27 wherein the conversion door extends the depth of the panel box by less than three inches.

29. A method for converting an installed manual transfer switch into an automatic transfer switch, comprising:

providing a conversion assembly;

mechanically mounting the conversion assembly directly onto the installed manual transfer switch;

electrically coupling a controller to the conversion assembly that automatically controls movements of the conversion assembly;

monitoring power supplies connected to the manual transfer switch with the controller;

automatically moving the conversion assembly into different positions to change the switching arrangements of the manual transfer switch according to the monitored power supplies;

rotating a cam in the conversion assembly in a first direction to turn off a first switch in the manual transfer switch and turn on a second switch in the manual transfer switch; and rotating the cam in a second direction to turn off the second switch and turn on the first switch.

30. A method according to claim 29 wherein rotating the cam in the first direction drops a first actuator assembly and raises a second actuator assembly in the conversion assembly and rotating the cam in the second direction lowers the second actuator assembly and raises the first actuator assembly.

31. A method according to claim 29 including rotating the cam into an intermediate position to turn off both the first and second switch.

32. An automatic transfer switch, comprising:

a first switch controlling connection of a first power supply to a load;

a second switch controlling connection of a second power supply to the load;

an actuator attaching to the first and second switch and moving the first and second switch into different on and off positions;

an operator moving the actuator into different positions including a first position where the first switch is in an on condition and the second switch is an off condition, a second position where the first switch is in an off condition and the second switch is in an on condition and a third position where the first and second switch are both in an off condition; and a controller moving the actuator into the different positions according to power levels on the first and second power supplies.

33. An automatic transfer switch according to claim 32 wherein the actuator includes a first actuator assembly that seats over a lever on the first switch and a second actuator assembly that seats over a lever on the second switch.

34. An automatic transfer switch according to claim 33 wherein the first and second actuator assembly each include an actuator plate that includes a hole that seats over one of the first and second switch levers.

35. An automatic transfer switch according to claim 33 wherein the first and second actuator assembly each include face plates having slots for receiving the operator and moving in accordance with a moving direction of the operator.

36. An automatic transfer switch according to claim 33 wherein the operator includes a motor that controls how long the first and second switches are both in the off condition by activating and deactivating the motor.

37. An automatic transfer switch, comprising:

a first switch controlling connection of a first power supply to a load;

a second switch controlling connection of a second power supply to the load;

an actuator attaching to the first and second switch and moving the first and second switch into different on and off positions wherein the actuator includes a first actuator assembly that seats over a lever on the first switch and a second actuator assembly that seats over a lever on the second switch;

an operator moving the actuator into different positions wherein the operator includes a motor sitting in between the first and second switches and a cam coupled to the motor that moves the actuator by rotating in either a clockwise or counterclockwise direction; and a controller moving the actuator into the different positions according to power levels on the first and second power supplies.

38. An automatic transfer switch according to claim 37 wherein the operator includes a cam roller connected to the cam that engages with slots in the actuator while the cam is rotated by the motor.

* * * * *

UNITED STATES PATENT AND TRADEMARK OFFICE

CERTIFICATE OF CORRECTION

PATENT NO. : 6,100,604
DATED : August 8, 2000
INVENTOR(S) : Morroni et al.

It is certified that error appears in the above-identified patent and that said Letters Patent is hereby corrected as shown below:

Column 2,
Line 46, "a" should read -- an --

Column 4,
Line 13, "in" should read -- is --
Line 65, "keep" should read -- keeps --

Column 7,
Line 34, "the, actuator" should read -- the actuator --

Signed and Sealed this

Nineteenth Day of March, 2002

*Attest:*

JAMES E. ROGAN
*Director of the United States Patent and Trademark Office*

*Attesting Officer*